United States Patent
Garcia et al.

(10) Patent No.: US 11,525,471 B2
(45) Date of Patent: Dec. 13, 2022

(54) SNAP RING RETENTION

(71) Applicant: GM GLOBAL TECHNOLOGY OPERATIONS LLC, Detroit, MI (US)

(72) Inventors: Pete R. Garcia, Troy, MI (US); Boris Burgman, Oak Park, MI (US)

(73) Assignee: GM Global Technology Operations LLC, Detroit, MI (US)

(*) Notice: Subject to any disclaimer, the term of this patent is extended or adjusted under 35 U.S.C. 154(b) by 625 days.

(21) Appl. No.: 16/553,813

(22) Filed: Aug. 28, 2019

(65) Prior Publication Data
US 2021/0062851 A1 Mar. 4, 2021

(51) Int. Cl.
*F16B 21/07* (2006.01)
*B60K 17/24* (2006.01)
*F16B 21/18* (2006.01)

(52) U.S. Cl.
CPC .......... *F16B 21/078* (2013.01); *B60K 17/24* (2013.01); *F16B 21/18* (2013.01)

(58) Field of Classification Search
CPC ...... F16B 21/078; F16B 21/18; F16B 21/186; B60K 17/24
See application file for complete search history.

(56) References Cited

U.S. PATENT DOCUMENTS

| | | | | |
|---|---|---|---|---|
| 1,043,298 A | * | 11/1912 | Clark | F16L 55/132 220/236 |
| RE18,144 E | * | 8/1931 | Heiermann | F16J 1/18 384/903 |
| 4,006,659 A | * | 2/1977 | Wurzel | F16B 21/18 384/903 |
| 4,183,280 A | * | 1/1980 | Hashimoto | F16B 21/186 403/DIG. 7 |
| 4,343,581 A | * | 8/1982 | Millheiser | F16B 21/18 411/517 |

(Continued)

FOREIGN PATENT DOCUMENTS

GB 1248148 9/1971
KR 20030037337 5/2003

OTHER PUBLICATIONS

"Double L Snap Ring," Research Disclosure, Aug. 31, 2016.

(Continued)

*Primary Examiner* — Paul N Dickson
*Assistant Examiner* — Timothy Wilhelm
(74) *Attorney, Agent, or Firm* — Quinn IP Law

(57) ABSTRACT

A retention ring is configured to retain components within a transmission assembly. The retention ring has an annular main body defining an opening through a center thereof. The annular main body defines an outer curved surface and an inner curved surface, the annular main body having a distal face disposed in a distal plane and a proximal face disposed in a proximal plane. A first set of retention features extend from the inner curved surface, and a second set of retention features from the outer curved surface. One of the sets of retention features is configured to engage a backing plate or an outer member, and at least one of the sets of retention features is entirely disposed between the proximal plane and the distal plane. A transmission assembly includes the retention ring and an adjacent external snap ring.

20 Claims, 6 Drawing Sheets

(56) References Cited

U.S. PATENT DOCUMENTS

| | | | | |
|---|---|---|---|---|
| 4,594,040 A * | 6/1986 | Molina | F16B 5/0208 | 411/517 |
| 4,757,887 A * | 7/1988 | Ostrander | F16D 25/123 | 384/420 |
| 4,811,824 A * | 3/1989 | Kurihara | F16D 43/02 | 192/95 |
| 4,854,764 A * | 8/1989 | Faber | F16B 21/18 | 285/308 |
| 4,913,271 A * | 4/1990 | Kinoshita | F16D 41/07 | 192/113.32 |
| 4,961,486 A * | 10/1990 | Kinoshita | F16D 41/07 | 192/113.32 |
| 5,110,223 A * | 5/1992 | Koch | F16C 25/06 | 384/620 |
| 5,375,687 A * | 12/1994 | Inoue | F16D 47/06 | 192/70.23 |
| 5,411,369 A * | 5/1995 | Bouchard | F01D 25/246 | 415/209.2 |
| 5,542,619 A * | 8/1996 | Karlsson | A01K 89/0155 | 188/82.7 |
| 5,715,918 A * | 2/1998 | Everett | F16H 57/08 | 403/279 |
| 5,788,399 A * | 8/1998 | Smearsoll | F16D 1/06 | 403/348 |
| 5,906,255 A * | 5/1999 | Lee | F16D 25/0635 | 192/70.11 |
| 5,918,715 A * | 7/1999 | Ruth | F16D 41/125 | 192/69.1 |
| 5,992,592 A * | 11/1999 | Showalter | F16D 41/16 | 192/93 B |
| 6,062,611 A * | 5/2000 | Percebois | F16L 37/092 | 285/321 |
| 6,244,965 B1 * | 6/2001 | Klecker | F16D 41/14 | 464/81 |
| 6,368,039 B2 * | 4/2002 | Wolfe | F16D 1/08 | 310/91 |
| 6,739,440 B1 * | 5/2004 | Dick | F16D 41/16 | 192/39 |
| 7,011,199 B2 * | 3/2006 | Onishi | F16D 25/10 | 192/70.2 |
| 7,197,807 B2 * | 4/2007 | Schoch | F16B 21/18 | 29/446 |
| 7,223,198 B2 * | 5/2007 | Kimes | F16D 47/04 | 475/331 |
| 7,296,668 B2 * | 11/2007 | Fetting, Jr. | F16D 41/12 | 192/113.32 |
| 7,311,463 B2 * | 12/2007 | Haupt | F16B 21/183 | 403/204 |
| 7,344,010 B2 * | 3/2008 | Fetting, Jr. | F16D 41/125 | 192/43.1 |
| 7,364,395 B2 * | 4/2008 | Grimmer | F16B 21/18 | 403/DIG. 7 |
| 7,455,157 B2 * | 11/2008 | Kimes | F16D 41/12 | 192/108 |
| 7,686,147 B2 * | 3/2010 | Friedmann | F16D 13/58 | 192/55.61 |
| 7,743,678 B2 * | 6/2010 | Wittkopp | F16H 3/10 | 74/330 |
| 7,857,593 B2 * | 12/2010 | Garin | F01D 5/3015 | 416/220 R |
| 7,878,554 B2 * | 2/2011 | Le Bars | F16L 37/0915 | 285/321 |
| 7,971,690 B2 * | 7/2011 | Imaizumi | F16D 13/583 | 267/164 |
| 7,984,801 B2 * | 7/2011 | Hirayanagi | F16D 69/00 | 192/113.36 |
| 8,051,959 B2 * | 11/2011 | Eisengruber | F16D 41/125 | 192/43.1 |
| 8,079,453 B2 * | 12/2011 | Kimes | F16D 41/125 | 192/65 |
| 8,091,696 B2 * | 1/2012 | Wittkopp | F16D 41/14 | 192/43.1 |
| 8,337,111 B2 * | 12/2012 | Pajewski | F16H 57/0031 | 403/DIG. 7 |
| 8,409,050 B2 * | 4/2013 | Heitzenrater | F16H 57/08 | 475/331 |
| 8,499,600 B2 * | 8/2013 | Szuba | F16D 13/646 | 72/83 |
| 8,522,940 B2 * | 9/2013 | Prout | F16D 41/125 | 192/113.32 |
| 8,740,467 B2 * | 6/2014 | Ravenna | F16C 35/077 | 384/537 |
| 8,747,014 B2 * | 6/2014 | Raszkowski | F16H 57/0031 | 403/372 |
| 8,979,456 B2 * | 3/2015 | Soriano | F16B 5/0642 | 411/521 |
| 9,033,636 B2 * | 5/2015 | Burgman | F16B 21/186 | 411/517 |
| 9,121,442 B2 * | 9/2015 | Stern | F16C 17/04 | |
| 9,321,310 B2 * | 4/2016 | Malik | B60B 35/12 | |
| 9,388,860 B2 * | 7/2016 | Berube | F16D 1/116 | |
| 9,551,372 B2 * | 1/2017 | Gutscher | F16B 21/186 | |
| 9,664,279 B2 * | 5/2017 | Heuver | F16D 13/52 | |
| 9,759,245 B2 * | 9/2017 | Bowman | F16B 21/183 | |
| 9,933,005 B2 * | 4/2018 | Kahl | B23P 19/084 | |
| 9,933,097 B2 * | 4/2018 | Buttolph | F42B 15/36 | |
| 10,221,906 B2 * | 3/2019 | Burgoon | F16D 65/123 | |
| 10,267,368 B2 * | 4/2019 | Deneszczuk | F16D 25/12 | |
| 10,323,527 B2 * | 6/2019 | Stricker | F01D 9/042 | |
| 10,697,489 B1 * | 6/2020 | Deneszczuk | F16D 13/52 | |
| 2009/0078525 A1 * | 3/2009 | Schumacher | F16D 11/10 | 192/69.41 |
| 2014/0023459 A1 | 1/2014 | Ayad | | |

OTHER PUBLICATIONS

"Anti-Rotation Feature in a Uniform Cross-Section Snap Ring," Research Disclosure, Jan. 4, 2018.

U.S. Appl. No. 16/244,485, titled "Snap Ring Having Retention Features," filed by GM Global Technology Operations LLC on Jan. 10, 2019.

\* cited by examiner

SNAP RING RETENTION

FIELD

The present disclosure relates to a retention ring. More specifically, the present disclosure relates to a retention ring for use in a transmission assembly of a motor vehicle.

INTRODUCTION

A typical multiple speed transmission uses a combination of friction clutches, planetary gear arrangements, and fixed interconnections to achieve a plurality of gear ratios. The number and physical arrangement of the planetary gear sets, generally, is dictated by packaging, cost and desired speed ratios.

One or more retainer rings or snap rings may be used to retain transmission components in an axial direction. For example, a snap ring may be used to retain a backing plate axially in place within a friction clutch assembly or to couple gears axially with respect to other members.

A retainer ring or snap ring is typically a substantially circular or annular retaining device, which may have a break or opening that divides the ring into two interconnected curvilinear members. The members may be deflected or flexed to facilitate insertion into a mating groove. Snap rings are constructed to direct a retaining or clamping force along the circumference or periphery of the snap ring when properly inserted onto a component. Specifically, the directional force is most commonly used to retain or clamp together various mating components.

There are generally two styles of snap rings: an internal snap ring employed for applying outwardly-directed clamping force, and an outer or external snap ring positioned for applying inwardly-directed clamping force. Sometimes multiple snap rings are required, depending on the geometry of the surrounding components.

For example, referring to FIG. 1, a first snap ring 10 (which is the outer/external snap ring type that applies an inwardly-directed clamping force) may be used to retain a backing plate 12 to an inner hub 14, but a second snap ring 16 may be disposed adjacent to the first snap ring 10 to occupy space 18 between the first snap ring 10 and an inner surface 20 of the backing plate 12, so that the first snap ring 10 does not substantially open upon experiencing centrifugal forces. An additional third snap ring 22 (which is the inner snap ring type that applies an outwardly-directed clamping force) may then be used to retain the second snap ring 16 in an axial direction A with respect to the backing plate 12. Thus, three different snap rings 10, 16, 22 are used to retain the clutch assembly 24 illustrated in FIG. 1.

SUMMARY

The present disclosure provides a retention ring for retaining another external snap ring in a radial direction, while cooperating with the external snap ring to retain two members in an axial direction. The retention ring includes a first set of retention features extending outwardly from an annular main body and a second set of retention features extending inwardly from the annular main body. One of the sets of retention features is configured to engage a recess in a member such as a backing plate or an external gear, and the other set of retention features engages the external snap ring to prevent it from escaping the groove in which it is disposed. Accordingly, only two snap rings are required, and the need for the third snap ring 22, as shown in FIG. 1, is eliminated.

In one form, which may be combined with or separate from the other forms disclosed therein, a retention ring for retaining components within a transmission assembly is provided. The retention ring includes an annular main body defining an outer curved surface and an inner curved surface. The annular main body has a body distal face disposed in a distal plane and a body proximal face disposed in a proximal plane. The annular main body defines a central opening between the body proximal face and the body distal face. A plurality of outer retention features extends from the outer curved surface of the annular main body, with each outer retention feature being configured to engage a member, such an external gear or a backing plate. A plurality of inner retention features extends from the inner curved surface of the annular main body and into the central opening.

In another form, which may be combined with or separate from the other forms disclosed herein, a transmission assembly is provided that includes an inner member and an outer member defining at least one recess therein. A snap ring pair is configured to retain the inner and outer members together in an axial direction. The snap ring pair includes an external snap ring and a retention snap ring. The external snap ring contacts both the inner and outer members and is partially disposed in a groove defined by the inner member. The retention snap ring is disposed adjacent to the external snap ring and contacts the outer member. The retention snap ring has an annular main body defining an outer curved surface and an inner curved surface, and the annular main body has a body distal face disposed in a distal plane and a body proximal face disposed in a proximal plane. The annular main body defines a central opening between the body proximal face and the body distal face. The retention snap ring also has a plurality of outer retention features and a plurality of inner retention features. The plurality of outer retention features extends from the outer surface that faces the outer member. Each outer retention feature is disposed in the recess(es). The plurality of inner retention features extends from the inner surface that faces the external snap ring. The plurality of inner retention features extends from the annular main body toward the external snap ring.

Optional additional features may be provided, including but not limited to the following: each outer retention feature being entirely disposed between the proximal plane and the distal plane; each outer retention feature having a circular base; each outer retention feature being shaped as a portion of a sphere; each inner retention feature having a feature proximal face lying in the proximal plane and a feature distal face lying in the distal plane; each inner retention feature having an inner face extending from the feature proximal face to the feature distal face; the inner face being flat or concave; the annular main body and both of the pluralities of retention features being unitarily formed as one piece; the retention ring being formed of a plastic material; the plurality of inner retention features being disposed equidistant from one another about the inner or outer curved surface of the annular main body; the plurality of outer retention features being disposed equidistant from one another about the inner or outer curved surface of the annular main body; each outer retention feature being disposed at a midpoint between adjacent inner retention features; the retention snap ring being disposed radially around the external snap ring; the outer member being splined to the inner member; the outer member defining a lead-in chamfer configured to aid in placing the retention snap ring with respect to the outer member; and disposing the plurality of outer retention features into the recess(es).

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of this disclosure. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 2:
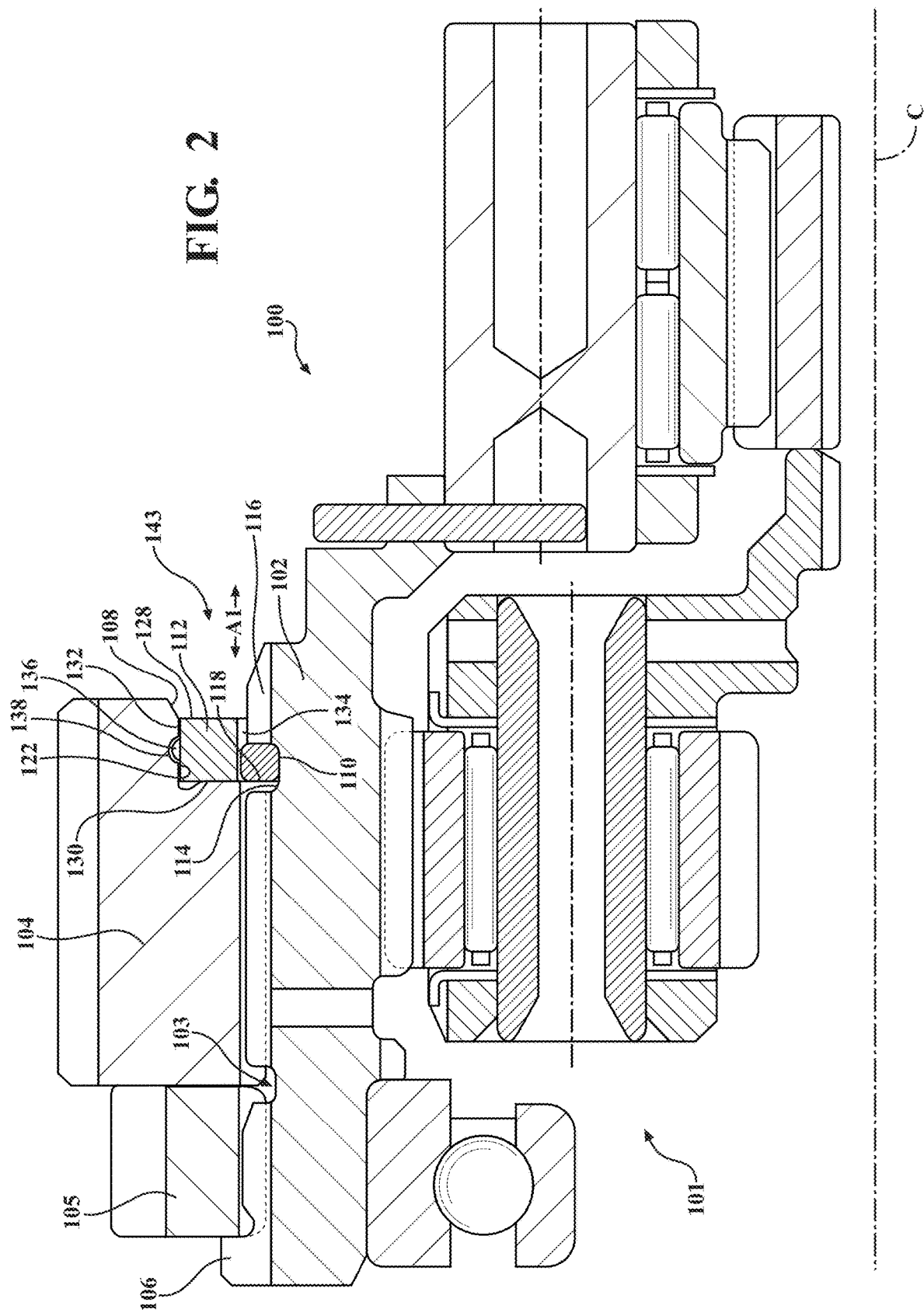
FIG. 2 is a schematic side cross-sectional view of a portion of a transmission assembly having a snap ring pair including an external snap ring and a retention snap ring disposed radially outward of the external snap ring, in accordance with the principles of the present disclosure.
Figure 3:
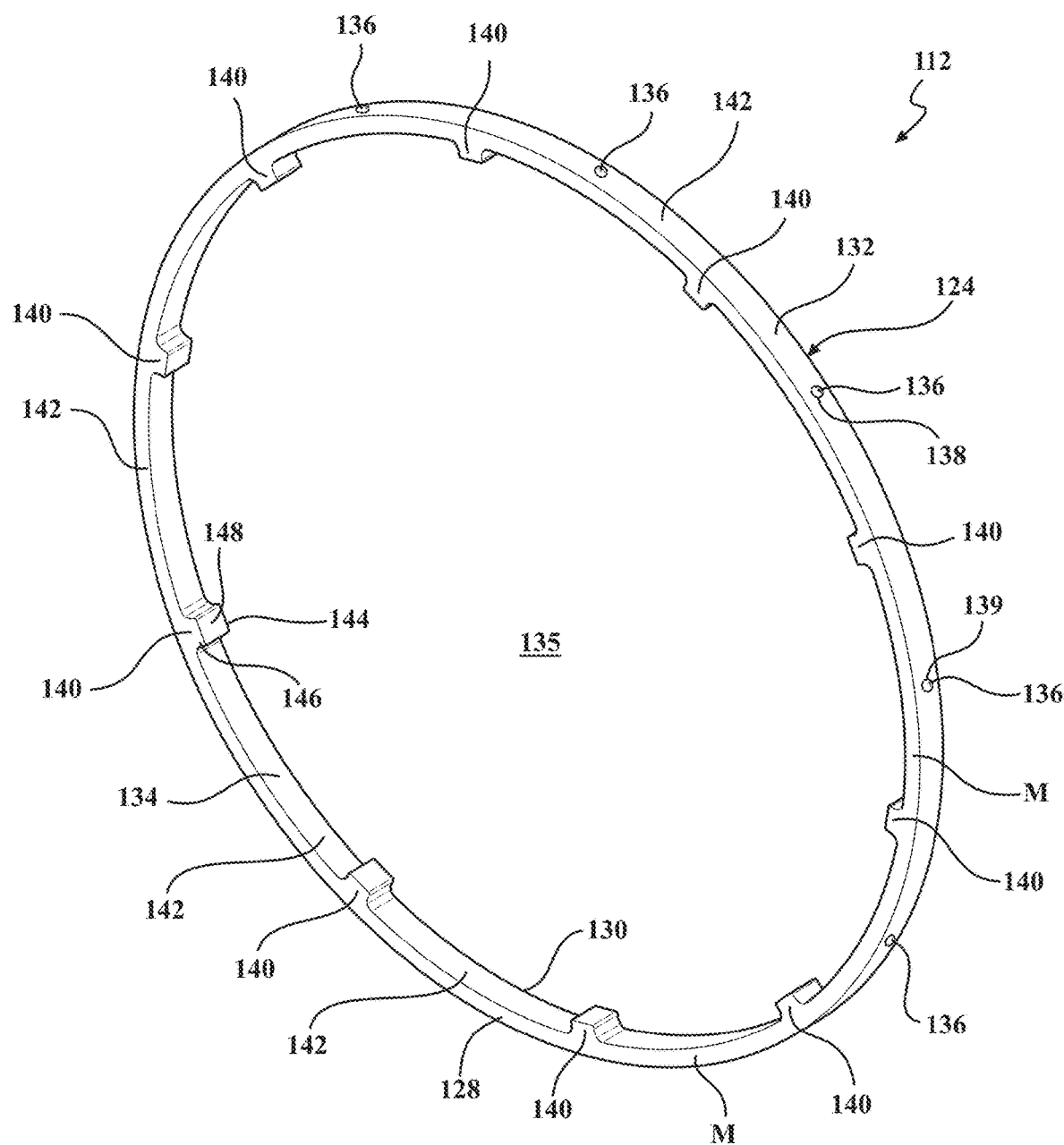
FIG. 3 is perspective view of the retention snap ring of the transmission assembly of FIG. 2, according to the principles of the present disclosure.
Figure 4:
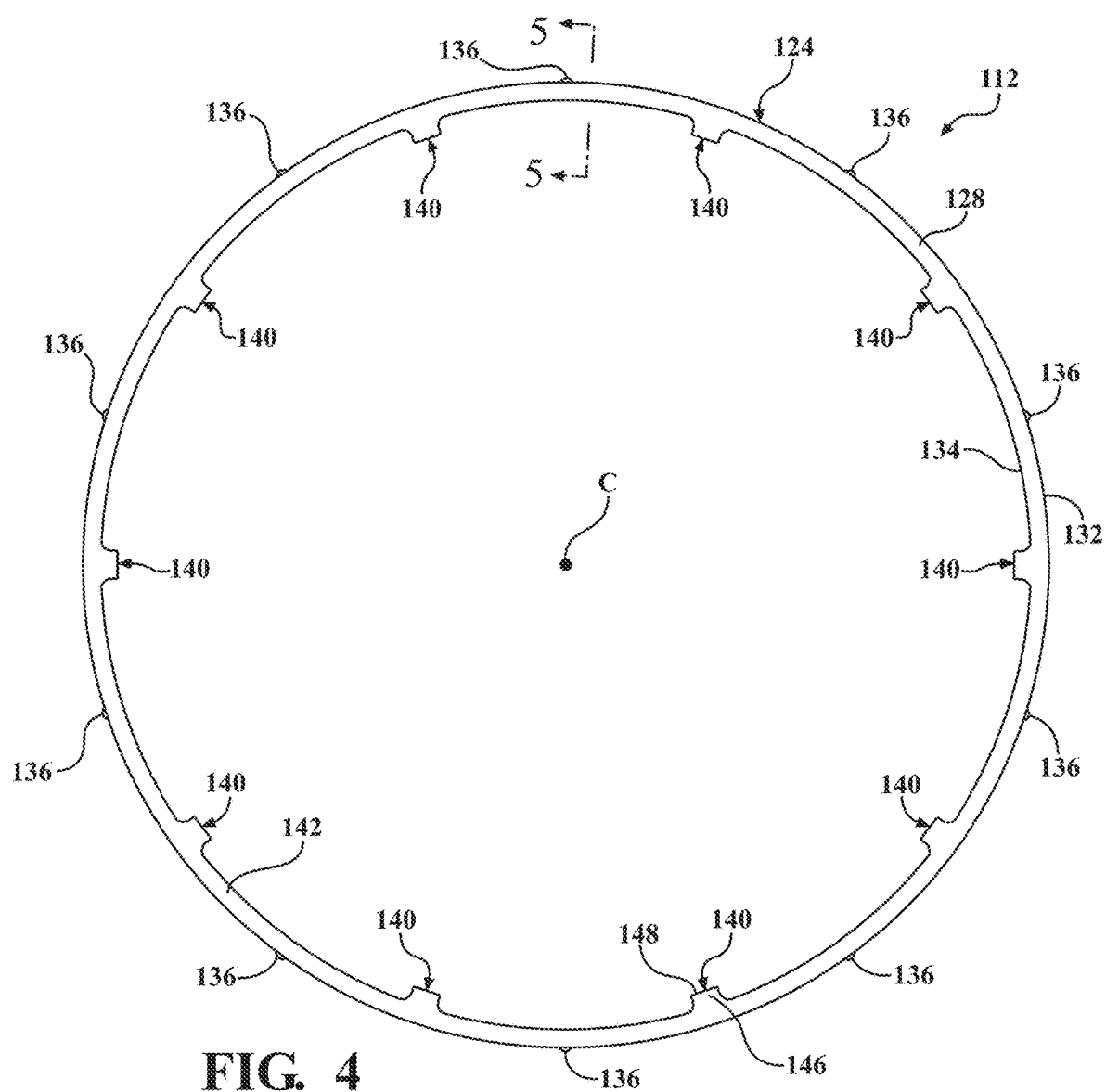
FIG. 4 is an end view of the retention snap ring shown in FIGS. 2 and 3, in accordance with the principles of the present disclosure.

Referring now to FIG. 2, a portion of a transmission assembly is illustrated and generally designated at 100. In this example, the transmission assembly 100 includes a carrier assembly 101 that has an internal gear 102. The internal gear 102 has outer spline surface 103 onto which a park gear 105 and an external gear 104 are disposed, where the park gear 105 and the external gear 104 engage the splined surface 103 with corresponding splines. The park gear 105 abuts a lip 106 formed on an end of the internal gear 102.

To retain each of the park gear 105 and the external gear 104 in an axial direction A1 with respect to the internal gear 102, a snap ring pair 108 is included. The snap ring pair 108 includes an external snap ring 110 and a retainer snap ring, or retention ring 112. Similar to the function of the snap ring 10 shown in FIG. 1, the external snap ring 110 restrains the external gear 104 and the park gear 105 against axial movement in the A1 direction because the external snap ring 110 is partially disposed in a spline, recess, or groove 114 formed within the internal gear 102, and the external snap ring 110 abuts a lip 116 of the internal gear 102 and an axially-facing surface 118 of the external gear 104. Thus, the external snap ring 110 fills the gap that would otherwise be present between the lip 116 and the external gear 104. Accordingly, the internal gear 102, the external gear 104, and the park gear 105 are retained together in the axial direction A1. The external snap ring 110 is described as "external" because it applies an inwardly-directed clamping force onto the internal gear 102.

Although the external snap ring 110 is an outer/external snap ring configured to apply an inwardly-directed clamping force, upon sufficient centrifugal force, the external snap ring 110 may move radially outward and could move out of the groove 114. Therefore, an additional retention snap ring 112 is used to occupy the space 120 between the external snap ring 110 and a radially inward facing surface 122 of the external gear 104, so that the external snap ring 110 does not substantially open upon experiencing applied forces. Due to the unique configuration of the retention snap ring 112, which will be described in further detail below, no additional inner snap ring (such as the additional snap ring 22 shown in FIG. 1) is needed to axially secure the retention snap ring 112 to the external gear 104. The retention snap ring 112 is disposed radially around the external snap ring 110, as shown in FIG. 2.

Referring now to FIGS. 3-7, and with continued reference to FIG. 2, the retention snap ring 112 has an annular main body 124 defining an opening 135 through a center thereof. The annular main body 124 may form a continuous ring as shown, or it may have a break in the ring, which is illustrated more clearly in the version shown in FIG. 8. The annular main body 124 defines a body distal face 128 disposed in a distal plane D and an opposite body proximal face 130 disposed in a proximal plane P. The body distal face 128 and the body proximal face 130 are perpendicular to a central axis of the transmission assembly 100 and to a central axis C of the retention snap ring 112. The annular main body 124 further defines an outer curved surface 132 and an inner curved surface 134.

Figure 5:
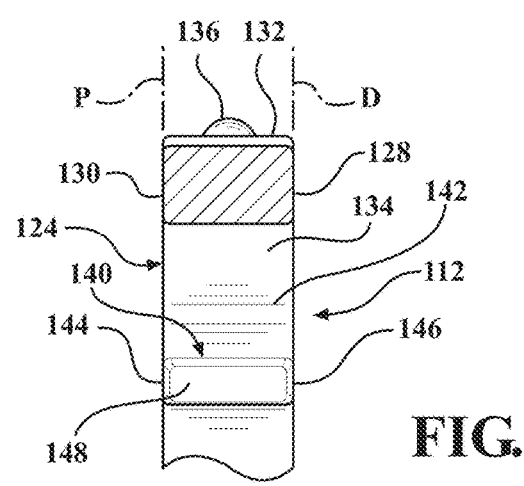
FIG. 5 is a side cross-sectional view of a portion of the retention snap ring shown in FIGS. 2-4, according to the principles of the present disclosure.
Figure 6:
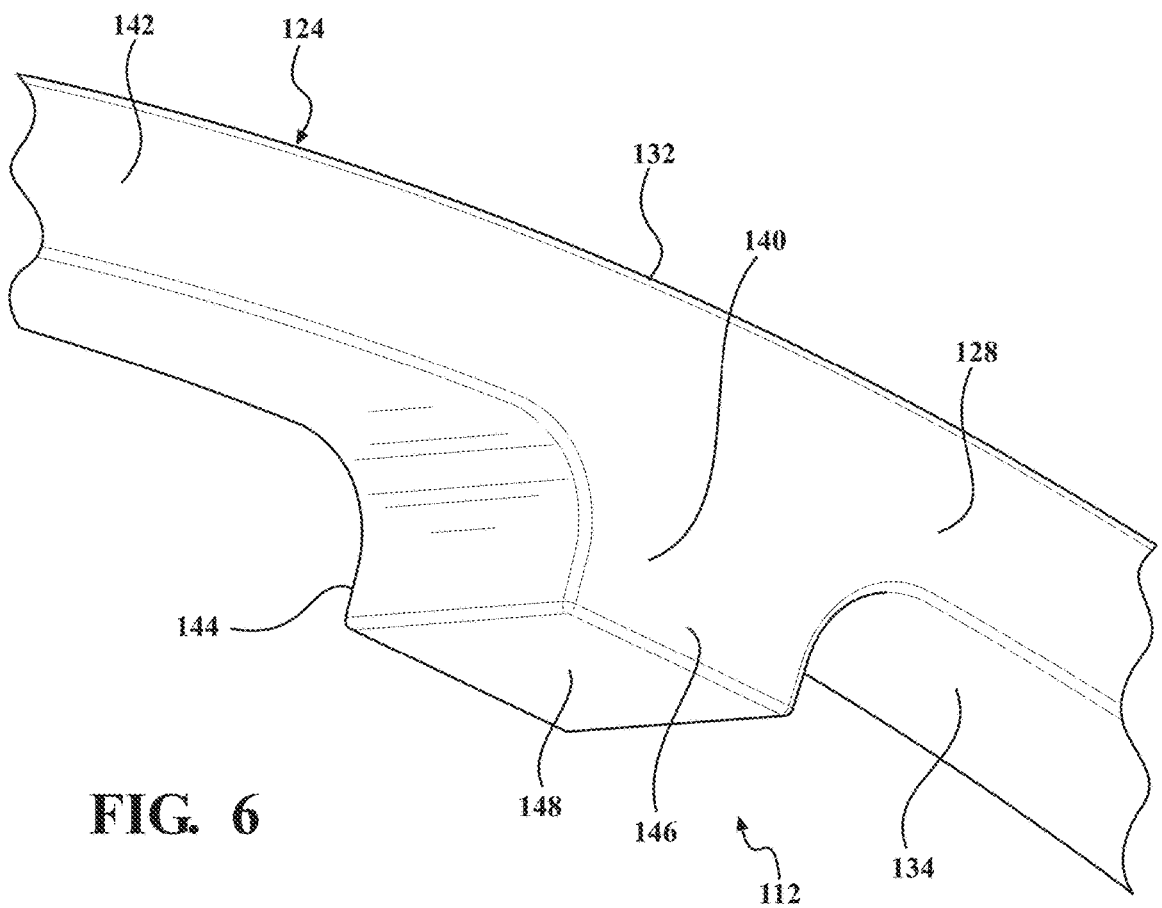
FIG. 6 is cross-sectional view of a portion of the retention snap ring shown in FIGS. 2-5 showing an inner retention feature, according to the principles of the present disclosure.
Figure 7:
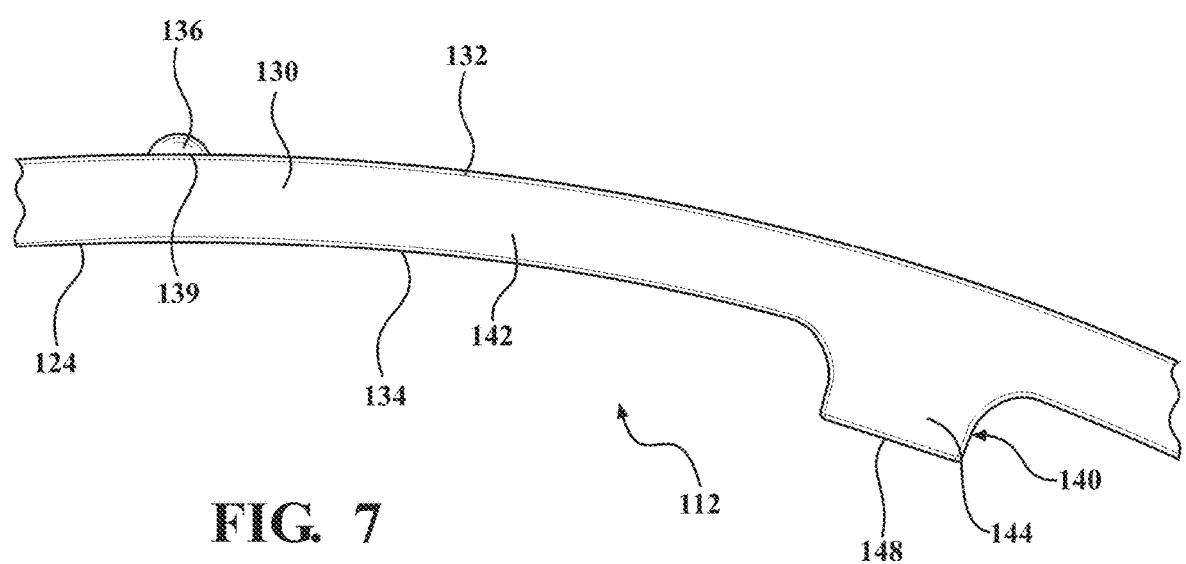
FIG. 7 is an end view of a portion of the retention snap ring shown in FIGS. 2-6 showing an outer retention feature, according to the principles of the present disclosure.

A plurality of outer retention features 136 extends from the outer curved surface 132 of the annular main body 124. Each of the outer retention features 136 is configured to engage the external gear 104 through at least one recess 138 defined radially within the external gear 104, or within a backing plate recess if a blacking plate is used, such as the backing plate 12 shown in FIG. 1. The recess 138 may be formed as one continuous annular recess within the radially inward facing surface 122 of the external gear 104, or individual discontinuous recesses may be formed within the surface 122 of the external gear 104. Each outer retention feature 136, in this example, has a circular base 139 and is shaped as a portion of a sphere. In the illustrated example, each outer retention feature 136 is entirely disposed between the proximal plane P and the distal plane D, as best shown in FIG. 5.

A plurality of inner retention features 140 extends from the inner curved surface 134 of the annular main body 124 and into the central opening 135. The inner retention features 140 are configured to engage the external snap ring 110 as it would start to move outward through application of centrifugal force. The inner retention features 140 allow the retention snap ring 112 to engage the external snap ring 110 while portions 142 of the retention snap 112 between the inner retention features 140 are thinner and can be compressed to install the retention snap ring 112 within the transmission assembly 100.

In some versions, the member 104 that defines the recess 138 for receiving the outer retention features 136 further defines a lead-in chamfer 143 configured to aid in placing the retention snap ring 112 with respect to the member 104, which in this case is the external gear 104, and disposing the outer retention features 136 into the recess 138. The retention snap ring 112 may be compressed and slid over the lead-in chamfer 143 and pushed in a leftward direction in the orientation shown in FIG. 2 until the annular main body 124 expands to move the retention features 136 into the recess 138.

Each inner retention feature 140 has a feature proximal face 144 lying in the proximal plane P, a feature distal face 146 lying in the distal plane P, and an inner face 148 extending from the feature proximal face 144 to the feature distal face 146. The inner face 148 is flat or concave in the version illustrated in FIGS. 3-7. In the illustrated example, the feature proximal face 144 of each inner retention features 140 is integrally formed with the body proximal face 130 of the annular main body 124 and together the proximal faces 130, 144 form a continuous flat surface. Similarly, the feature distal face 146 of each inner retention feature 140 is integrally formed with the body distal face 128 of the annular main body 124 and together the distal faces 128, 146 form a continuous flat surface.

In the illustrated example, the annular main body 124, the outer retention features 136, and the inner retention features 140 are unitarily formed as one piece. However, it should be understood, that the retention features 136, 140 and the annular main body 124 could be formed as separate pieces and attached together, if desired.

To the form the unique shape of the retention snap ring 112, it may be desirable to form the retention snap ring 112 from a plastic material, for example, nylon or another polyamide. The retention snap ring 112 may be formed of plastic because it does not retain a large axial load like the external snap ring 110. Rather the retention snap ring 112 withstands only a small axial load within the recess 138, and the retention snap ring 112 mostly receives only a radially load on the inner faces 148 of the inner retention features 140, which originates with the external snap ring 110.

In the illustrated example, the outer retention features 136 are disposed equidistant from one another about the outer curved surface 132 of the annular main body 124. However, in some examples, the outer retention features 136 could have other spacing. Similarly, the inner retention features 140 are disposed equidistant from one another about the inner curved surface 134 of the annular main body 124, but in the alternative, they could have other spacing. Furthermore, in the illustrated example, each outer retention feature 136 is disposed at a midpoint M between adjacent inner retention features 140 to provide force balancing, but other configurations are also contemplated.

Thus, the retention snap ring 112 provides the ability to retain the external snap ring 110 that experiences high RPM conditions while still ensuring manufacturability, ease of assembly, reduced mass, reduced complexity, fewer parts, and improved system balance through a self-centering design and optimization of material distribution. A third snap ring 22 is no longer required.

Figure 1:
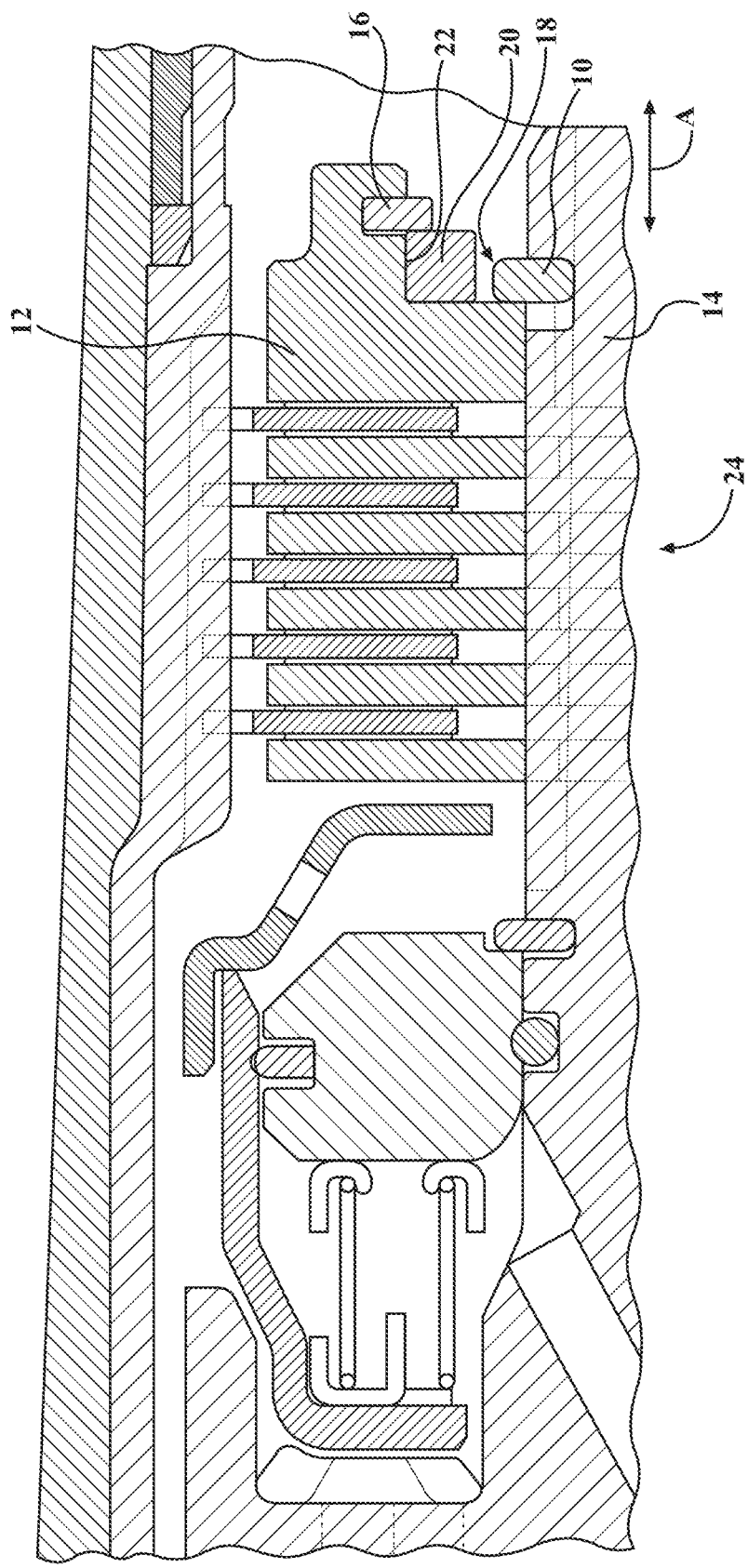
FIG. 1 is a schematic side cross-sectional view of a portion of a friction clutch assembly including three snap rings used together to retain the friction clutch assembly.

Though the snap ring pair 108 is illustrated retaining a park gear 105 and an external gear 104 axially on a splined surface 103 of an internal gear 102 of a planetary carrier assembly 101, in the alternative, the snap ring pair 108 could be used in place of the three snap rings 10, 16, 22 in the friction clutch assembly 24 of FIG. 1. Or, the snap ring pair 108 may be used to retain any other components in a transmission or another assembly.

Figure 8:
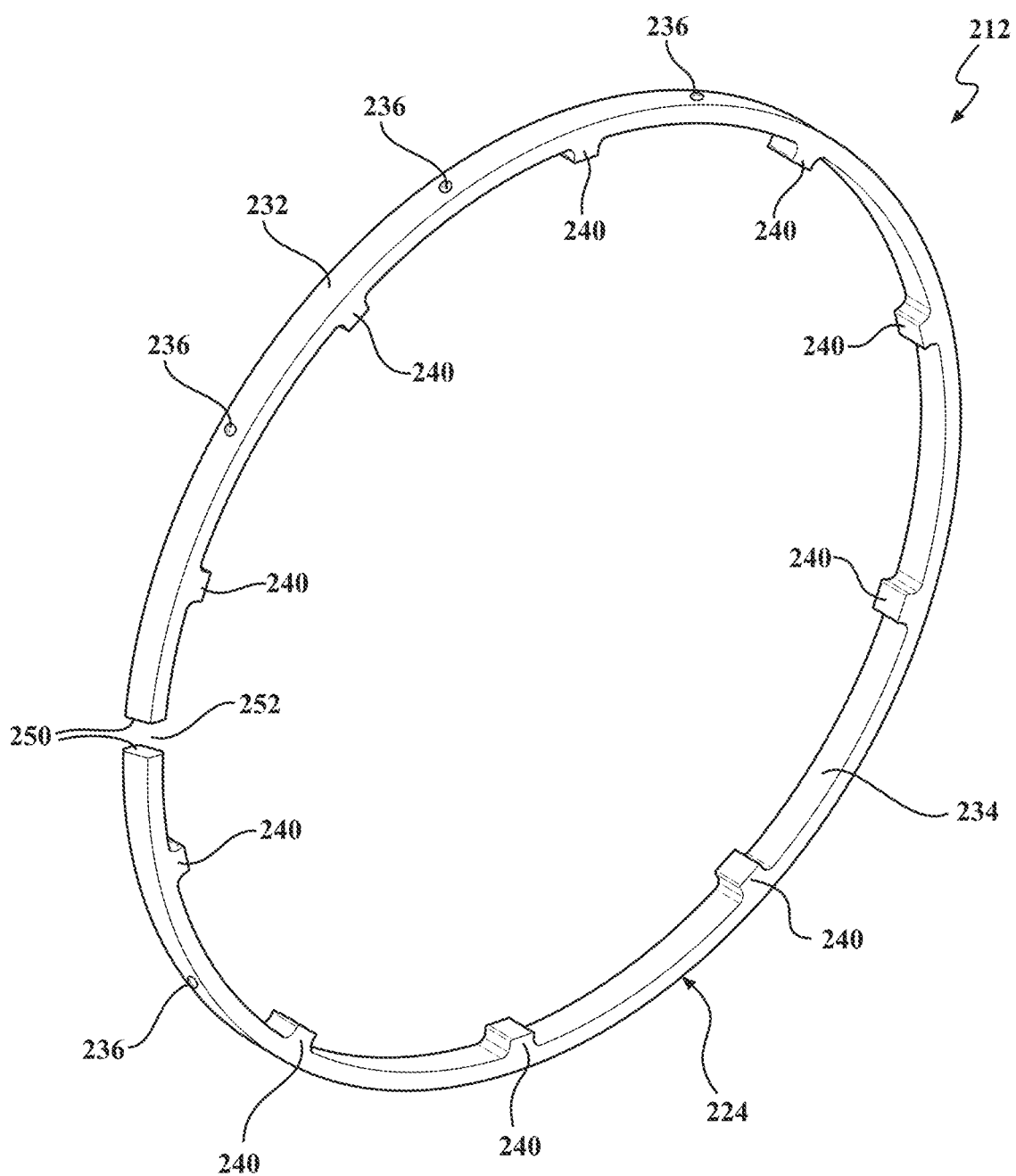
FIG. 8 is a perspective of another retention snap ring that could be used in place of the retention snap ring shown in FIG. 2, in accordance with the principles of the present disclosure.

Referring now to FIG. 8, another variation of a retention snap ring is illustrated and generally designated at 212. It should be understood that the retention snap ring 212 may be used in place of the retention snap ring 112 shown in FIG. 2 and may have any of the features described above with respect to the snap ring 112. For example, the retention snap ring 212 may have an annular main body 224, a plurality of outer retention features 236 extending from an outer curved surface 232, and a plurality of inner retention features 240 extending from an inner curved surface 234.

The annular main body 224 may form a discontinuous ring that has ends 250 defining a break 252 in the ring. The break 252, or gap, in the annular main body 224 allows for the retention snap ring 212 to be compressed so that it may be moved into position to place the outer retention features 236 into the recess 138 defined by the outer member 104. The gap may be in the range of 5 to 10 degrees of the overall circumference of the retention ring 212, by way of example.

The description of the disclosure is merely exemplary in nature and variations that do not depart from the gist are intended to be within the scope of the present disclosure. Such variations are not to be regarded as a departure from the spirit and scope of the present disclosure.

What is claimed is:

1. A retention ring for retaining components within a transmission assembly, the retention ring comprising:
    an annular main body including an outer curved surface and an inner curved surface, the annular main body having a body distal face disposed in a distal plane and a body proximal face disposed in a proximal plane, and the annular main body defining a central opening between the body proximal face and the body distal face;
    a plurality of outer retention features extending from the outer curved surface of the annular main body, each of the outer retention features being configured to engage a member of the transmission assembly, and each of the outer retention features having a circular base and being entirely disposed between the proximal plane and the distal plane; and
    a plurality of inner retention features extending from the inner curved surface of the annular main body and into the central opening.

2. The retention ring of claim 1, wherein the outer retention features are spaced circumferentially around the annular main body and project radially outward from the outer curved surface.

3. The retention ring of claim 1, wherein each of the outer retention features is interleaved between a respective pair of the inner retention features with respect to a circumference of the annular main body.

4. The retention ring of claim 1, wherein each of the outer retention features is shaped as a portion of a sphere.

5. The retention ring of claim 1, wherein each of the inner retention features has a feature proximal face lying in the proximal plane and a feature distal face lying in the distal plane.

6. The retention ring of claim 5, wherein each of the inner retention features has an inner face extending from the feature proximal face to the feature distal face, the inner face being flat or concave.

7. The retention ring of claim 1, wherein the annular main body and the pluralities of inner and outer retention features are unitarily formed as one piece, the retention ring being formed of a plastic material.

8. The retention ring of claim 1, wherein the inner retention features are disposed equidistant from one another about the inner curved surface of the annular main body, and the outer retention features are disposed equidistant from one another about the outer curved surface of the annular main body.

9. The retention ring of claim 8, wherein each of the outer retention features is disposed at a midpoint between adjacent inner retention features of the plurality of inner retention features.

10. A transmission assembly comprising:
an inner member;
an outer member defining at least one recess therein; and
a snap ring pair configured to axially retain the inner and outer members together in an axial direction, the snap ring pair comprising:
an external snap ring contacting the inner member and the outer member, the external snap ring being partially disposed in a groove defined by the inner member; and
a retention snap ring disposed adjacent to the external snap ring and contacting the outer member, the retention snap ring comprising:
an annular main body including an outer curved surface and an inner curved surface, the annular main body having a body distal face disposed in a distal plane and a body proximal face disposed in a proximal plane, the annular main body defining a central opening between the body proximal face and the body distal face, the outer curved surface facing the outer member and the inner curved surface facing the external snap ring;
a plurality of outer retention features extending from the outer curved surface, each of the outer retention features being disposed in the at least one recess; and
a plurality of inner retention features extending from the inner curved surface, the plurality of inner retention features extending from the annular main body toward the external snap ring.

11. The transmission assembly of claim 10, each outer retention feature of the plurality of outer retention features being entirely disposed between the proximal plane and the distal plane.

12. The transmission assembly of claim 11, each outer retention feature of the plurality of outer retention features having a circular base and being shaped as a portion of a sphere.

13. The transmission assembly of claim 10, each inner retention feature of the plurality of inner retention features having a feature proximal face lying in the proximal plane and a feature distal face lying in the distal plane.

14. The transmission assembly of claim 13, each inner retention feature of the plurality of inner retention features having an inner face extending from the feature proximal face to the feature distal face.

15. The transmission assembly of claim 10, the annular main body and the pluralities of outer retention features and inner retention features being unitarily formed as one piece.

16. The transmission assembly of claim 15, the retention snap ring being formed of a plastic material.

17. The transmission assembly of claim 10, the outer member defining a lead-in chamfer configured to aid in placing the retention snap ring with respect to the outer member and disposing the plurality of outer retention features into the at least one recess.

18. The transmission assembly of claim 10, the plurality of outer retention features being disposed equidistant from one another about the annular main body, and the plurality of inner retention features being disposed equidistant from one another about the annular main body, each outer retention feature of the plurality of outer retention features being disposed at a midpoint between adjacent inner retention features of the plurality of inner retention features.

19. The transmission assembly of claim 10, the retention snap ring being disposed radially around the external snap ring.

20. The transmission assembly of claim 10, the outer member being splined to the inner member.

* * * * *